US012606130B2

(12) United States Patent
Chelaidite et al.

(10) Patent No.: US 12,606,130 B2
(45) Date of Patent: Apr. 21, 2026

(54) ELECTROMECHANICAL BRAKE FOR VEHICLE

(71) Applicants: ZF Active Safety US Inc., Livonia, MI (US); ZF Active Safety GmbH, Koblenz (DE)

(72) Inventors: Galus Chelaidite, South Lyon, MI (US); Felix Hiester, Rueber (DE)

(73) Assignees: ZF ACTIVE SAFETY US INC., Livonia, MI (US); ZF ACTIVE SAFETY GMBH, Koblenz (DE)

( * ) Notice: Subject to any disclaimer, the term of this patent is extended or adjusted under 35 U.S.C. 154(b) by 384 days.

(21) Appl. No.: 18/327,258

(22) Filed: Jun. 1, 2023

(65) Prior Publication Data

US 2024/0400008 A1 Dec. 5, 2024

(51) Int. Cl.
| | |
|---|---|
| *B60T 13/74* | (2006.01) |
| *B60T 1/00* | (2006.01) |
| *F16D 63/00* | (2006.01) |
| *F16D 125/48* | (2012.01) |
| *F16D 127/06* | (2012.01) |

(52) U.S. Cl.
CPC ............ *B60T 1/005* (2013.01); *F16D 63/006* (2013.01); *F16D 2125/48* (2013.01); *F16D 2127/06* (2013.01)

(58) Field of Classification Search
CPC ............ F16D 2127/06; F16D 2125/48; F16D 2129/08; F16D 2121/24; F16D 2121/20; B60T 1/005; H02K 7/1023
USPC ............................................. 188/163; 310/77
See application file for complete search history.

(56) References Cited

U.S. PATENT DOCUMENTS

| | | | | |
|---|---|---|---|---|
| 3,183,426 A | * | 5/1965 | Haydon | G04C 5/005 74/504 |
| 3,339,681 A | * | 9/1967 | Holladay | F16D 49/00 188/163 |

(Continued)

FOREIGN PATENT DOCUMENTS

| | | |
|---|---|---|
| DE | 19833304 A1 | 2/2000 |
| DE | 10233673 A1 | 3/2003 |

(Continued)

OTHER PUBLICATIONS

Search Report of the corresponding German patent application dated Jan. 24, 2025, pp. 1-8.

*Primary Examiner* — Bradley T King
(74) *Attorney, Agent, or Firm* — Tarolli, Sundheim, Covell & Tummino LLP

(57) ABSTRACT

A locking mechanism for a caliper assembly of an electro-mechanical brake for a wheel rotor includes a motor gear of a motor. A pawl is pivotable relative to the motor gear and extends from a first end to a second end. The first end includes a pair of arms and the second end includes a locking tab. The pawl has a first position in which the locking tab is spaced from the motor gear to permit torque transfer between the motor gear and the gear train and a second position in which the locking tab engages the motor gear to prevent torque transfer between the motor gear and the gear train. First and second permanent magnets are provided on the respective arms. An electromagnet cooperates with the first and second permanent magnets to place the pawl in the first position or the second position.

17 Claims, 11 Drawing Sheets

(56)            References Cited

U.S. PATENT DOCUMENTS

| | | | | |
|---|---|---|---|---|
| 5,007,464 | A * | 4/1991 | Gorris | D03D 47/363 |
| | | | | 66/219 |
| 6,405,836 | B1 * | 6/2002 | Rieth | F16D 65/18 |
| | | | | 188/162 |
| 6,752,249 | B1 * | 6/2004 | Jungbecker | F16D 65/18 |
| | | | | 188/162 |
| 7,458,442 | B2 * | 12/2008 | Kolberg | F16D 49/00 |
| | | | | 188/1.11 E |
| 9,976,614 | B2 | 5/2018 | Gerber et al. | |
| 2002/0084657 | A1 * | 7/2002 | Spurr | E05B 77/12 |
| | | | | 292/201 |
| 2005/0077782 | A1 * | 4/2005 | Horiuchi | B60T 13/741 |
| | | | | 303/20 |
| 2005/0109568 | A1 * | 5/2005 | Ether | B60T 13/741 |
| | | | | 188/72.1 |
| 2005/0217952 | A1 * | 10/2005 | Usui | F16D 65/18 |
| | | | | 188/162 |
| 2005/0258683 | A1 * | 11/2005 | Yamaguchi | F16D 65/18 |
| | | | | 188/162 |
| 2006/0023390 | A1 * | 2/2006 | Spurr | H01H 51/22 |
| | | | | 361/160 |
| 2006/0131113 | A1 * | 6/2006 | Christof | B60T 8/00 |
| | | | | 188/72.1 |
| 2006/0170282 | A1 * | 8/2006 | Yamaguchi | F16D 65/18 |
| | | | | 188/1.11 R |
| 2007/0114843 | A1 * | 5/2007 | Kawahara | B60T 13/74 |
| | | | | 303/122 |
| 2014/0102844 | A1 * | 4/2014 | Greene | F16D 41/12 |
| | | | | 192/45.1 |
| 2016/0160941 | A1 * | 6/2016 | Green | F16D 27/09 |
| | | | | 192/71 |
| 2018/0319626 | A1 * | 11/2018 | Shiraishi | B66B 5/044 |
| 2019/0152460 | A1 | 5/2019 | Antanaitis et al. | |
| 2019/0331180 | A1 | 10/2019 | Chelaidite | |
| 2020/0180582 | A1 * | 6/2020 | Stohr | F16D 65/183 |
| 2021/0156437 | A1 * | 5/2021 | Lee | B25J 9/10 |
| 2022/0307562 | A1 * | 9/2022 | Yoshizu | B60T 13/746 |
| 2022/0396252 | A1 * | 12/2022 | Karajgi | F16D 65/14 |
| 2023/0287947 | A1 * | 9/2023 | Hwang | F16D 55/226 |
| 2024/0025389 | A1 * | 1/2024 | Zhang | B60T 8/17 |
| 2024/0336238 | A1 * | 10/2024 | Hyeon | F16D 65/183 |
| 2025/0137506 | A1 * | 5/2025 | Zhang | F16D 55/226 |

FOREIGN PATENT DOCUMENTS

| | | |
|---|---|---|
| DE | 102011007342 A1 | 10/2012 |
| WO | 99/42739 A1 | 8/1999 |

* cited by examiner

Control System

ELECTROMECHANICAL BRAKE FOR VEHICLE

TECHNICAL FIELD

The present invention relates to braking systems and, in particular, relates to an electromechanical brake having a locking mechanism.

BACKGROUND

Current vehicles are equipped with hydraulic service brakes and electric parking brakes (EPB) for helping control vehicle braking depending on predetermined scenarios. The service brakes rely on one or more movable pistons that selectively apply force to brake pads in order to slow down or stop rotating wheel rotors on the vehicle. The EPB can be used to, for example, supplement the service braking and/or maintain the vehicle at a standstill on a hill.

SUMMARY

In one example, a locking mechanism for a caliper assembly of an electromechanical brake for a wheel rotor includes a motor gear of a motor. A pawl is pivotable relative to the motor gear and extends from a first end to a second end. The first end includes a pair of arms and the second end includes a locking tab. The pawl has a first position in which the locking tab is spaced from the motor gear to permit torque transfer between the motor gear and the gear train and a second position in which the locking tab engages the motor gear to prevent torque transfer between the motor gear and the gear train. First and second permanent magnets are provided on the respective arms. An electromagnet cooperates with the first and second permanent magnets to place the pawl in the first position or the second position.

In another example, a locking mechanism for a caliper assembly of an electromechanical brake for a wheel rotor includes a gear train comprising an assembly of gears including an idler gear and a motor gear of a motor. A pawl is pivotably connected to the idler gear axle about an axis and extends from a first end to a second end. The first end includes a pair of arms and the second end includes a locking tab. The pawl has a center of gravity on the pivot axis, such that the pawl is inertially neutral about the pivot axis. The pawl has a first position in which the locking tab is spaced from the motor gear to permit torque transfer between the motor gear and the rest of the gear train and a second position in which the locking tab engages the motor gear to prevent torque transfer between the motor gear to the rest of the gear train. A permanent magnet is provided on each of the arms. An electromagnet cooperates with the permanent magnets to place the pawl in the first position or the second position. The permanent magnets are always misaligned with the electromagnet including when the pawl is in the first position such that when the electromagnet is powered with a polarity that creates a magnet field which causes one of the permanent magnets to repel, the misalignment causes the permanent magnet to move in a specific direction, and the at least one permanent magnet to attract reinforcing the movement in the specific direction.

Other objects and advantages and a fuller understanding of the invention will be had from the following detailed description and the accompanying drawings.

DETAILED DESCRIPTION

Figure 1:
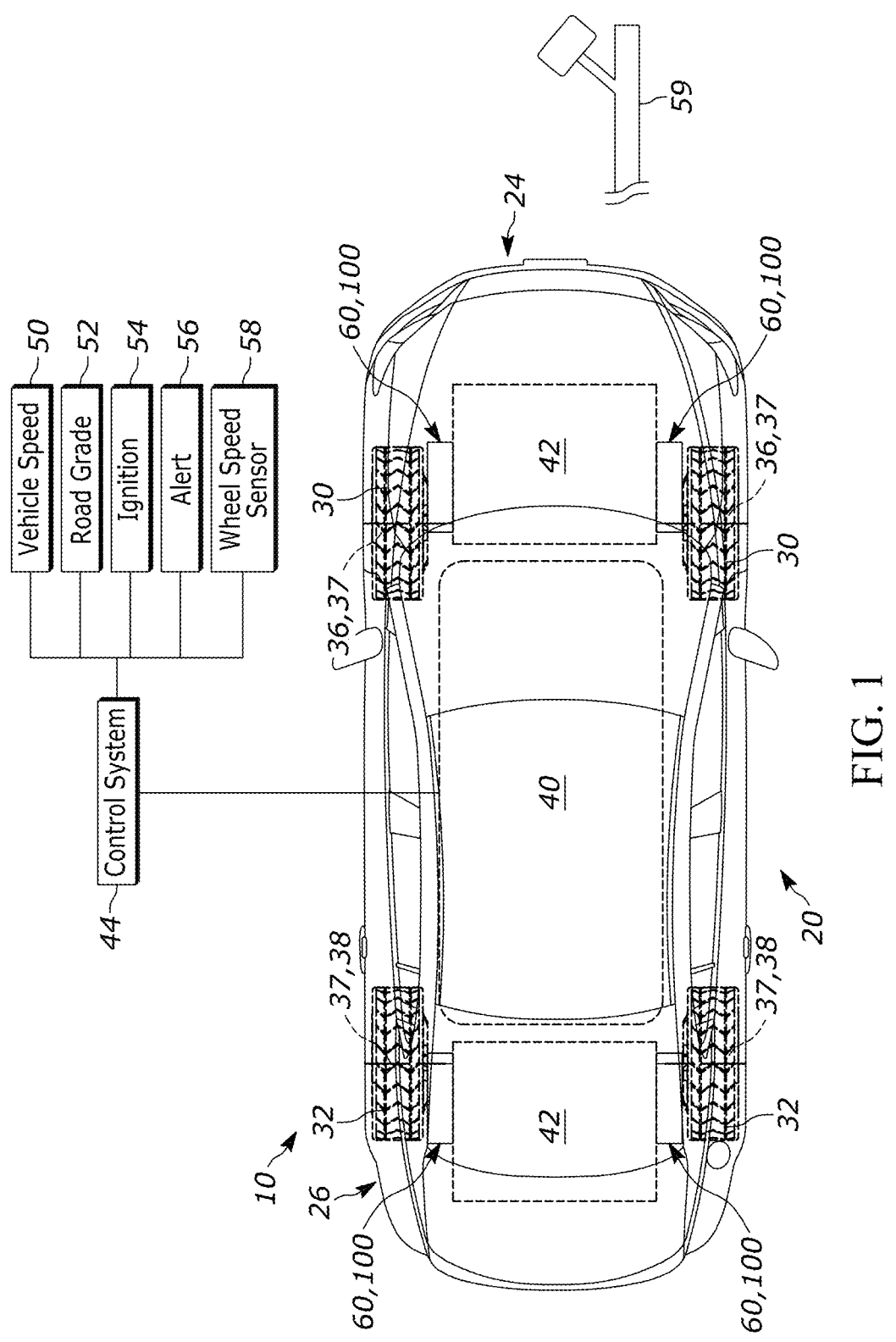
FIG. 1 is a schematic illustration of a vehicle having a braking system.

The present invention relates to braking systems and, in particular, relates to an electromechanical brake or EMB having a locking mechanism. FIG. 1 illustrates an example electromechanical brake/braking system 10 for a motor vehicle 20 in accordance with the present invention. The vehicle 20 can be an electric, hybrid or internal combustion engine powered vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

In the case of an electric vehicle, a battery 40 supplies power to the vehicle 20 and cooperates with front and/or rear powertrains 42 to supply torque to the wheels 30. In other words, the battery 40 forms part of the vehicle propulsion system.

A caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. The caliper assembly 60 is an electromechanical brake and therefore does not rely on or require hydraulic fluid to operate. The caliper assembly 60 includes a spindle and one or more pistons operably coupled thereto for selectively applying braking force F (see FIG. 2A) to the rotor 37 in a known manner.

The caliper assembly 60 can be configured as an assembly of at least one electric motor, gears, axles, bearings and a ball nut assembly (recirculating or non-recirculating), a roller screw, a ball ramp assembly or any high mechanical efficiency assembly capable of converting rotary motion generated at the spindle to linear motion at the piston(s). Examples of ball nut and ball ramp assemblies can be found in U.S. Pat. No. 9,976,614 and U.S. Patent Publication No. 2019/0331180, the entirety of which are incorporated herein by reference.

A control system 44 is provided to help control operation of the vehicle 20, such as operation of the propulsion system and vehicle braking, including operation of the caliper assemblies 60. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree—including velocity and acceleration—that a brake pedal 59 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions.

Figure 2A:
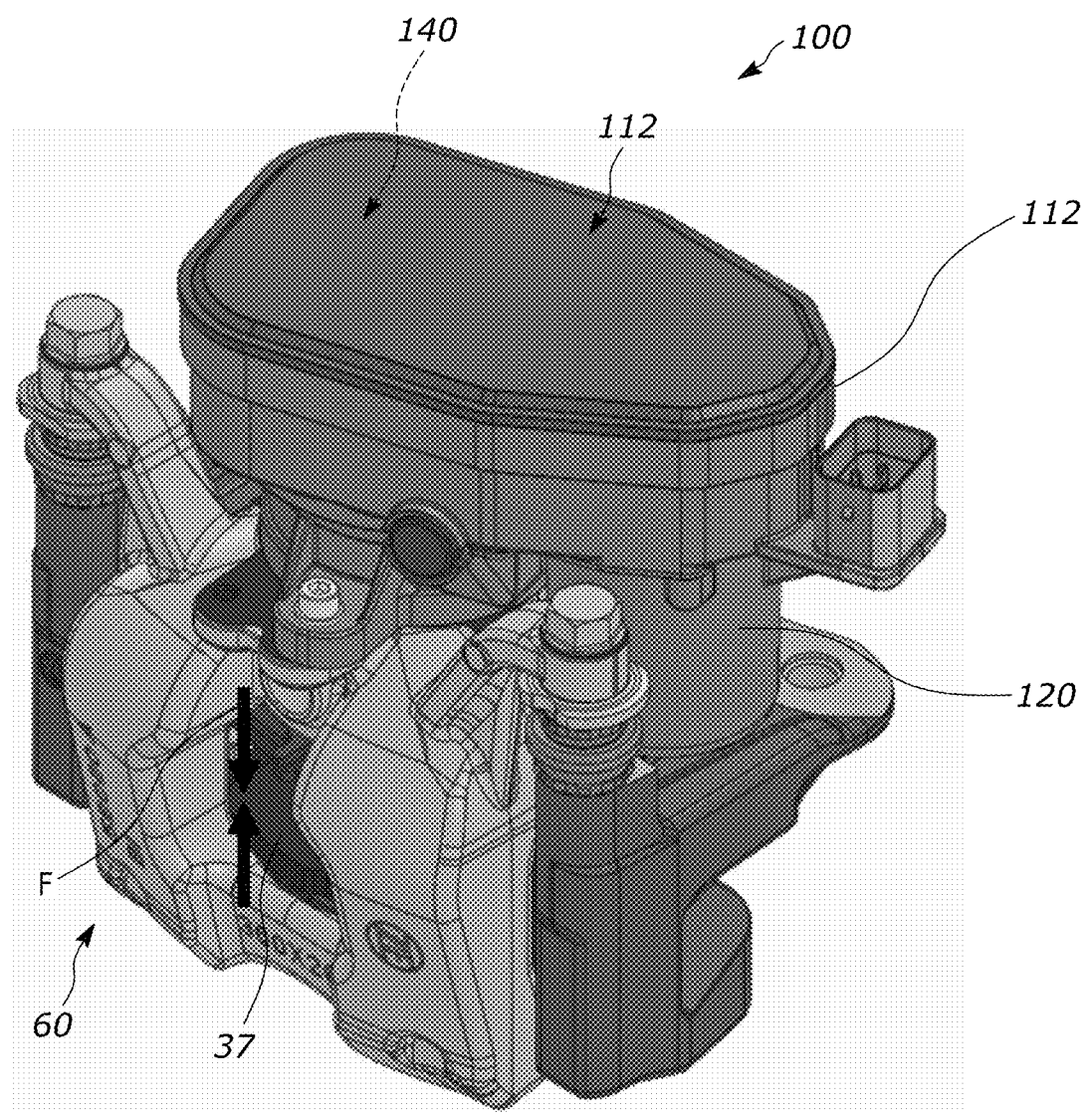
FIG. 2A is a perspective view of an example caliper assembly and actuator for the braking system of FIG. 1.
Figure 2B:
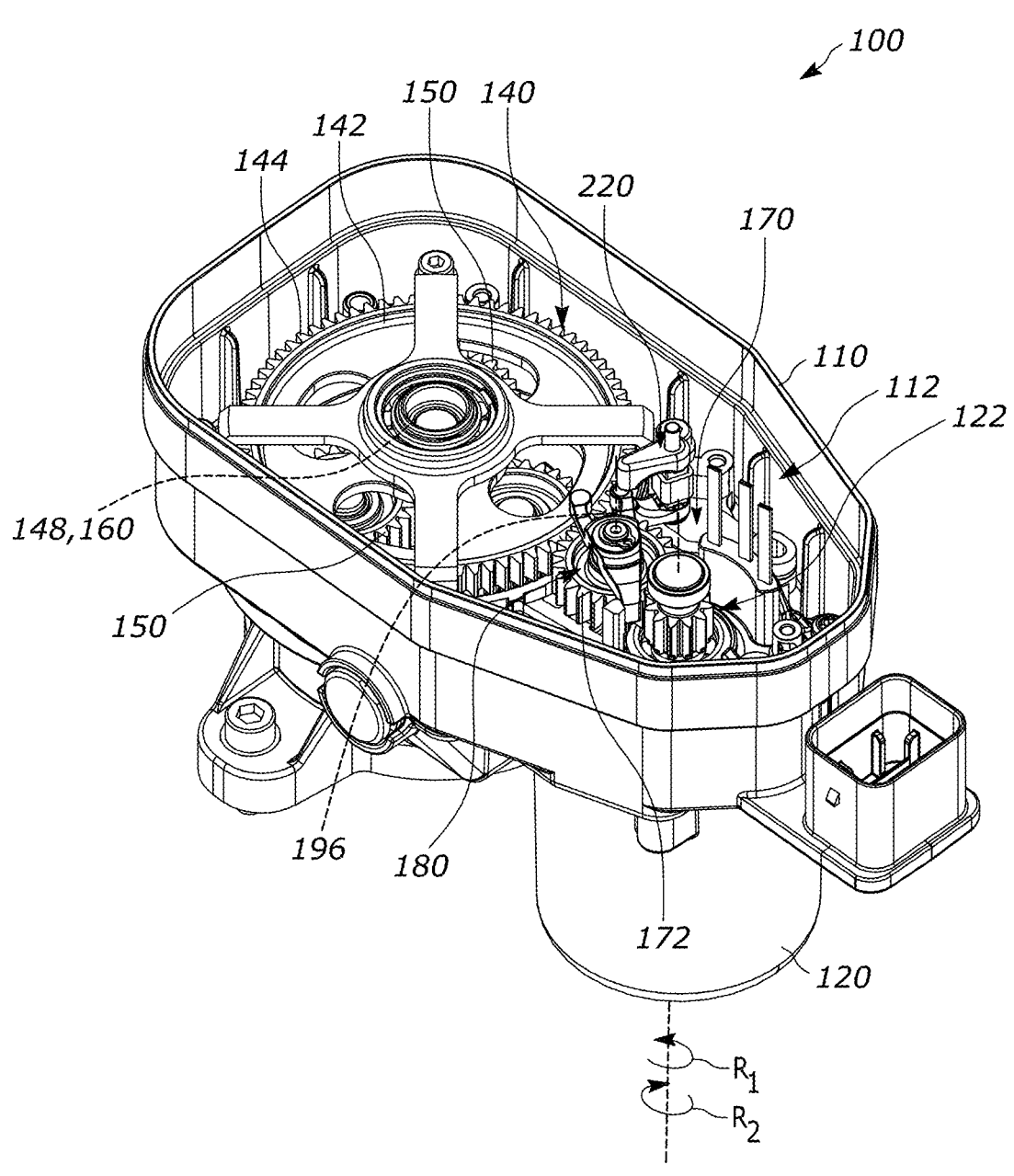
FIG. 2B is a perspective view of the actuator with a cover removed.

With this in mind, a motor gear unit or actuator 100 is connected to each caliper assembly 60 for helping to electrically control the application and removal of braking force F on each rotor 37. Referring to FIGS. 2A-2B, an example actuator 100 includes a housing 110 defining an interior space 112. A motor 120 is connected to the housing 110 and includes a pinion or motor gear 122. The motor 120 is actuated to rotate the motor gear 122 in the opposing manners $R_1$ or $R_2$ (counterclockwise or clockwise, respectively, as shown).

A gear train 140, is provided in the interior space 112 and connected to the caliper assembly 60. The gear train 140 includes a two-stage gear 142 having exterior teeth 144 and also defining a sun gear 148. Planet gears 150 provided on a carrier (not shown) are meshed with the sun gear 148 and orbit the sun gear in response to rotation of the carrier or rotation of the two-stage gear 142. The sun gear 148 includes interior teeth for rotatably connecting the sun gear to a spindle 160 of the caliper assembly 60.

The spindle 160, in turn, is threadably connected to an axially movable piston (not shown) such that rotation of the carrier (not shown) adjusts the longitudinal position of the piston for applying/releasing the parking brake on the rotor 37 in a known manner. In one example, the gear train 140 is configured such that rotation of the motor gear 122 in the manner $R_1$ results in advancing the piston towards the rotor 37 to apply braking force F thereto in order to brake the vehicle 20.

On the other hand, rotation of the motor gear 122 in the manner $R_2$ results in retreat of the piston away the rotor 37 to reduce or release braking force F on the rotor 37. It will be appreciated that gear trains different than that shown can be used to transfer torque between the motor 120 and the spindle 160. This can include, for example, more or less gears than shown in the gear train 140 and/or different gears than those illustrated and described.

Figure 3:
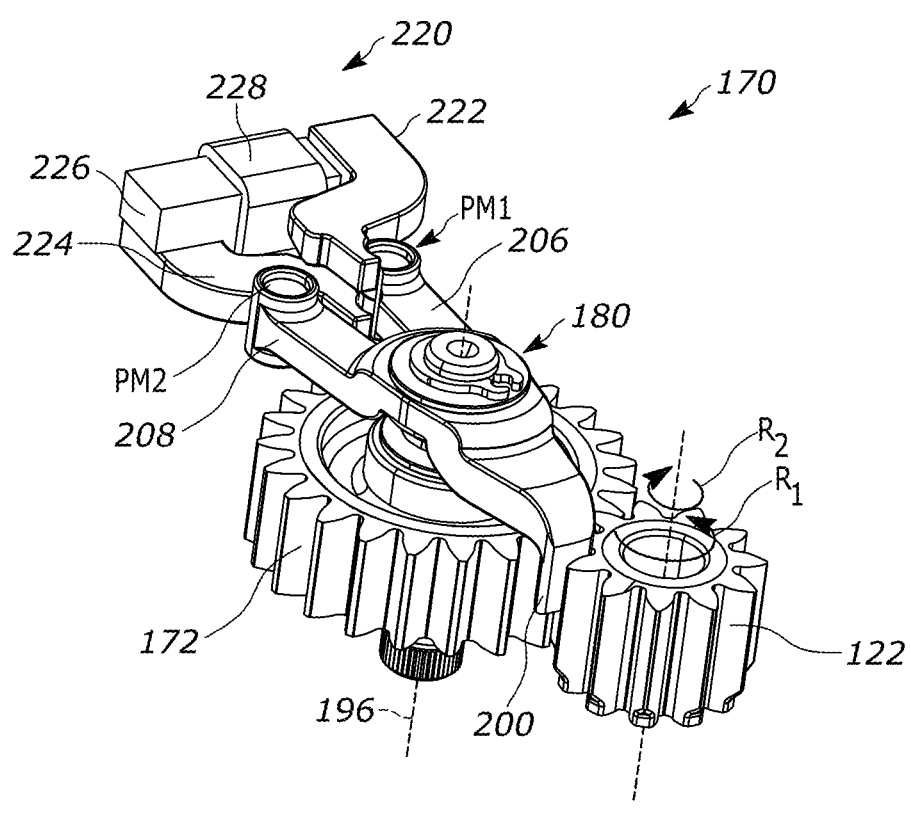
FIG. 3 is a schematic illustration of a locking mechanism of the actuator.

A bi-stable locking mechanism 170 (see also FIG. 3) operably engages or disengages the motor gear 122 of the motor 120 to lock or unlock the gear train 140. The locking mechanism 170 includes a pawl 180 and an electromagnet 220 that cooperate to selectively allow or prevent rotation of the motor gear 122. An idler gear 172 is meshed with the motor gear 122 and the two-stage gear 142 and mounted on an axle 194 secured to the housing 110. The pawl 180 is also mounted on the axle 194.

Figure 4:
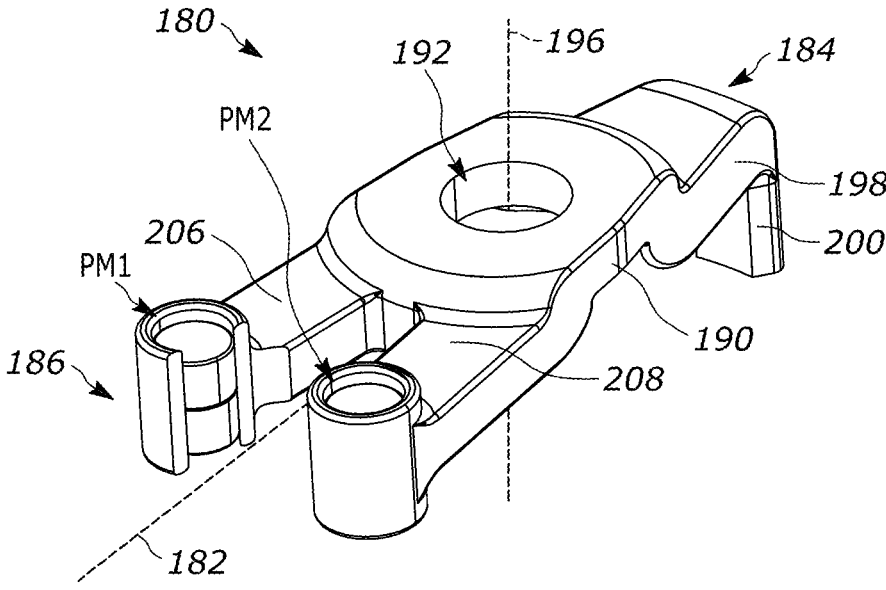
FIG. 4 is a schematic illustration of a pawl of the locking mechanism.

Referring to FIG. 4, the pawl 180 extends longitudinally along a centerline 182 from a first end 184 to a second end 186 and includes a base 190. An opening 192 extends through the base 190 and receives the axle 194 (see FIG. 3) such that the pawl is pivotable about a pivot axis 196. The pivot axis 196 is therefore coincident with the rotation axis of the idler gear 172. Alternatively, the axle 194/pivot axis 196 can be spaced or offset from the idler gear 172. In any case, the pawl 180 is positioned and configured in the actuator 100 so as to be independently pivotable relative to the idler gear 172 and the motor gear 122. The pawl 180 can be formed from a non-ferrous material, e.g., stainless steel, and/or covered in a non-magnetic material such as a plastic or polymer.

Figure 5:
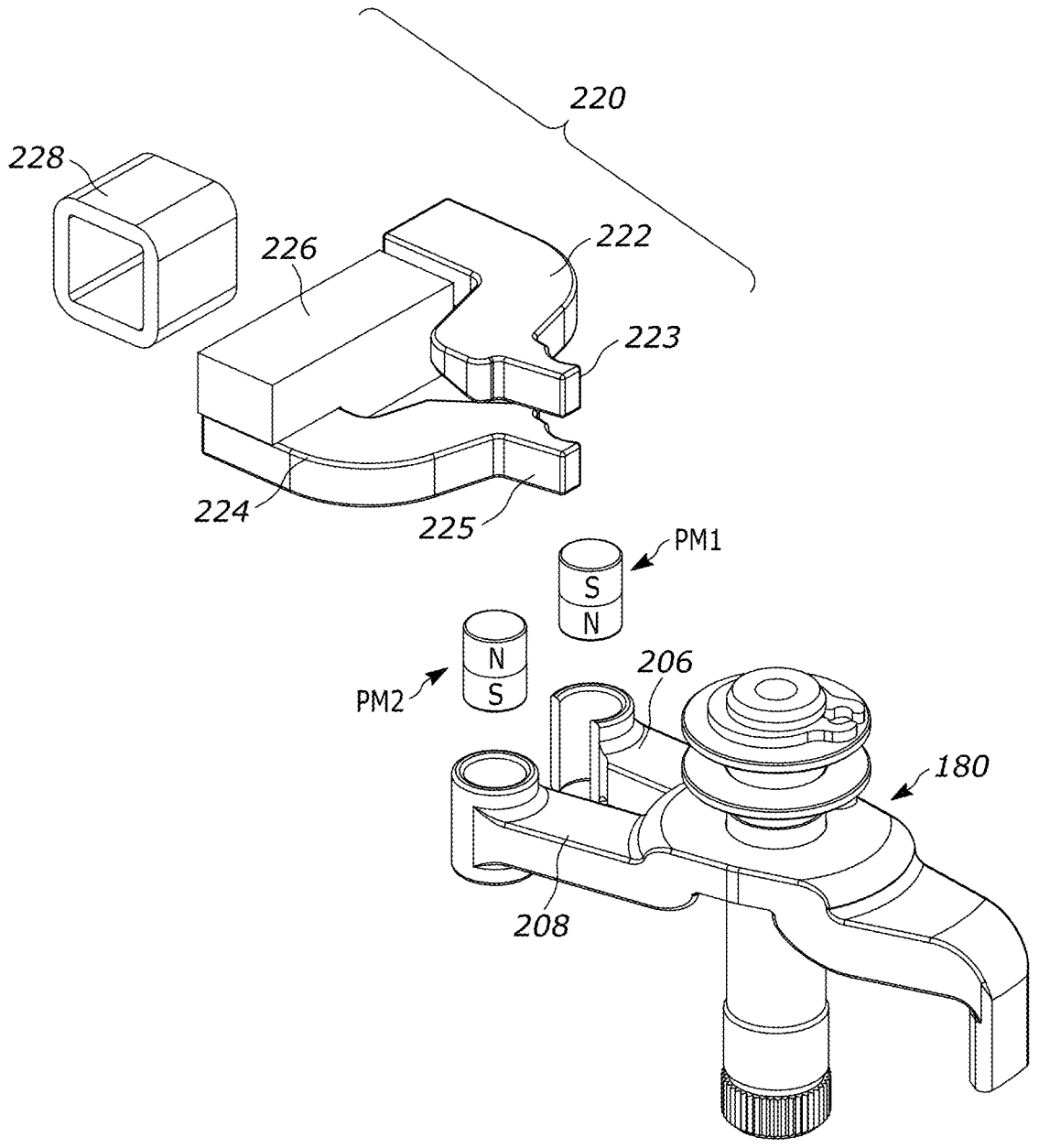
FIG. 5 is an isometric view of a bi-stable locking mechanism.

A projection 198 extends from the base 190 to the first end 184 and includes a locking tab 200. First and second arms 206, 208 extend from the base 190 on opposite sides of the centerline 182 to the second end 186. A first permanent magnet PM1 is provided on/in the first arm 206 and includes a north side N and a south side S (see also FIG. 5). As shown, in the first permanent magnet PM1 the south side S is oriented atop the north side N. The reverse orientation/polarity is also contemplated.

A second permanent magnet PM2 is provided on/in the second arm 208 and includes a north side N and a south side S. As shown, in the second permanent magnet PM2 the north side N is oriented atop the south side S. The reverse orientation/polarity is also contemplated so long as the first and second permanent magnets PM1, PM2 have opposing magnet polarity orientations from one another. In any case, the first and second permanent magnets PM1, PM2 can be formed from a magnetic material, such as a rare earth material Referring to FIG. 5 the electromagnet 220 includes a core 226. A pair of arms 222, 224 are in contact with and secured to the core 226. As shown, the arms 222, 224 extend from opposing ends (left and right as shown) as well as opposing sides (top and bottom as shown) of the core 226. Tips 223, 225 of the respective arms 222, 224 are vertically aligned with one another when the arms are secured to the core 226. A wire coil 228 is wrapped around/encircles the core 226 and is electrically connected to the control system 44 (not shown) such that the coil is capable of receiving electrical current via control signals from the control system 44. Retaining pins (not shown) extend through each arm 222, 224 core 226 to hold the electromagnet 220 together. The same, or additional pins or screws may be used to secure the electromagnet 220 to the housing 110 or to any adjacent part that is directly secured to the housing 110.

That said, the arms 222, 224 are made from a similar material as the core 226, to maintain the strength of the magnetic field generated in the core 226 to the tips 223, 225 of the arms 222, 224 respectively, than if these arms 222, 224 were made of a relatively less ferrous material(s). The electromagnet 220 does not generate a magnetic field until/ unless electrical current is supplied to coil 228. Furthermore, the magnetic field polarity can be switched depending on the electrical voltage polarity used to power the electromagnet 220. The electromagnet 220 is connected and fixed to the housing 110 to be stationary during operation of the actuator 100.

Figure 6A:
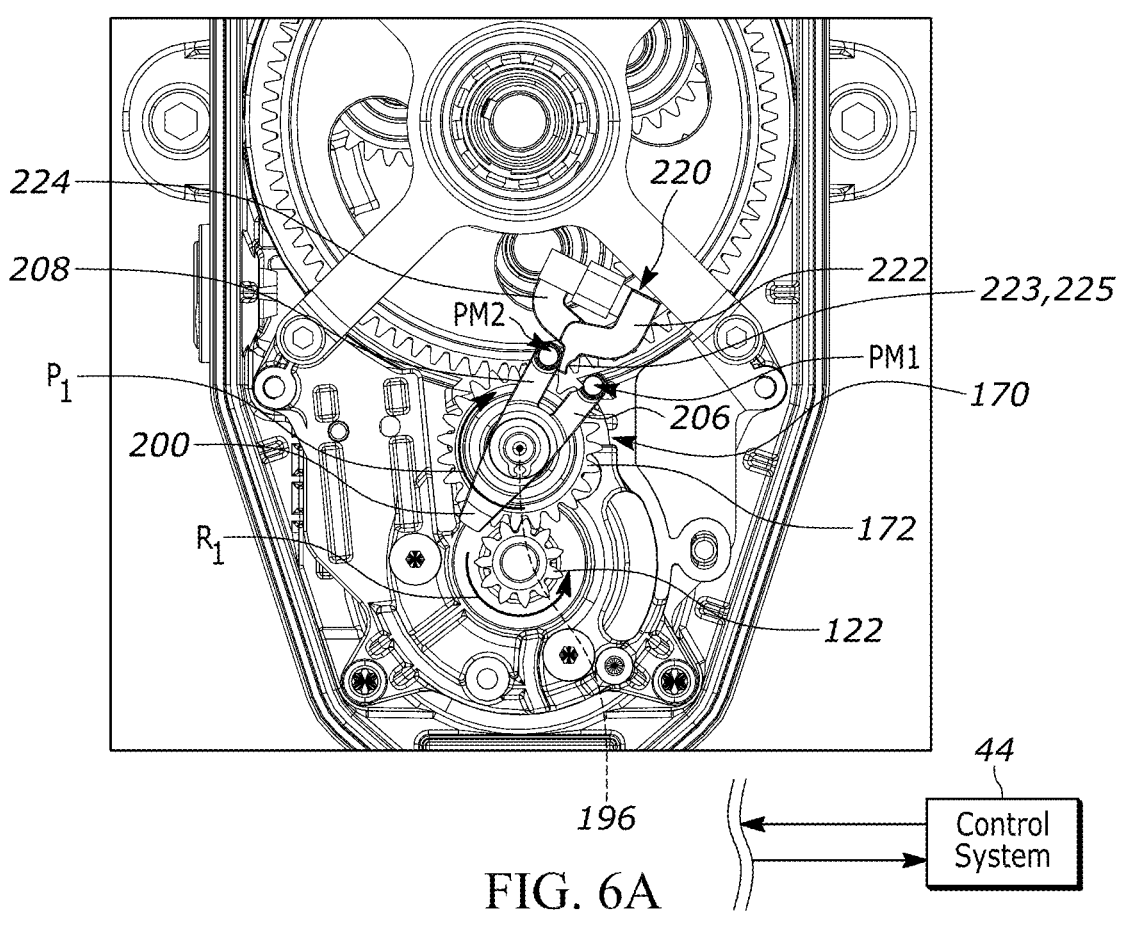
FIG. 6A is a schematic illustration of the locking mechanism in a first condition permitting rotation of a gear stage of the actuator.
Figure 6B:
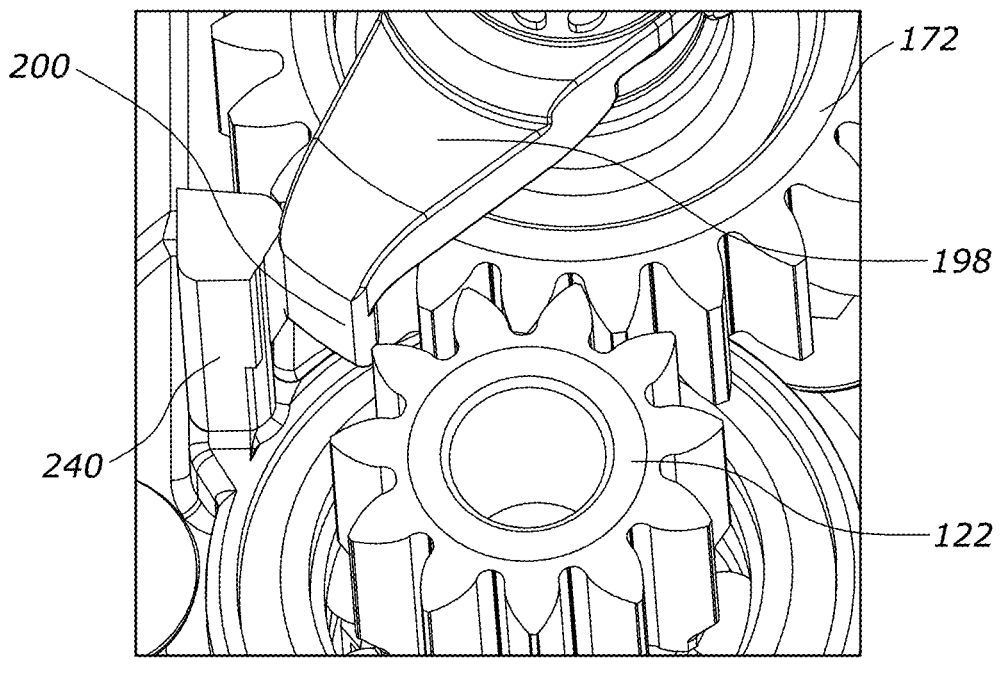
FIG. 6B is an enlarged view of a first end of the pawl when the locking mechanism is in the first condition.

Turning to FIGS. 6A-6B, during vehicle 20 operation, a service brake apply demand is initiated by the system and/or vehicle operator. In this example, service braking is provided for a single, rear end 26 wheel rotor 38. The brake demand is based on signals received by the control system 44 indicative of the brake pedal 59 depression. With this in mind, the control system 44 activates the motor 120 to rotate the motor gear 122 in a brake apply direction $R_1$ to supply torque to the spindle 160 along the aforementioned flow path. This, in turn, causes the piston to apply a braking force F to the brake pad 37, thereby braking the rotor 38. Rotation of the motor gear 122 continues up until the current draw level of the motor 120 is determined to generate a certain braking force F as requested by the driver applying the brake pedal, or, in case of parking the vehicle, as determined by the road grade.

It will be appreciated that rotation speed and torque of the motor 120 can be controlled precisely using, for example, pulse width modulation (PWM) control. For example, the degree and/or rate of braking force F on the pad 37 during braking can be finely tuned as well as the degree and/or rate of braking force reduction during an ABS event. The control system 44 can rely on signals from any of the sensors indicating, for example, road surface conditions, in controlling PWM.

In one example, when the electromagnet 220 is not activated (no power is supplied thereto) the permanent magnet PM1 or PM2 closest to the aligned tips 223, 225 of the arms 222, 224 of the electromagnet 220 remains in place. In other words, the permanent magnet PM1 PM2 closest to the tips 223, 225 will be attracted thereto when the electromagnet 220 is not activated and, thus, the pawl 180 will naturally pivot about the axis 196 until the arm 206, 208 bearing that closer permanent magnet abuts the tips. Consequently, in order to actively control pivotal movement of the pawl 180 to the desired position/condition, the electromagnet 220 must be powered with a polarity that repels the relatively closer permanent magnet PM1 or PM2 while attracting the relatively further away permanent magnet PM2 or PM1.

With this in mind, during driving and service braking of the vehicle 20, the locking mechanism 170 is configured to permit torque transfer between the motor 120 and the gear train 140. To this end, in FIGS. 6A-6B the electromagnet 220 is powered with a voltage polarity that generates a first magnetic polarity attracting the second permanent magnet PM2 (and thereby attracting the arm 208) to the tips 223, 225 while repelling the first permanent magnet PM1 (and thereby repelling the arm 206). This causes the pawl 180 to pivot about the axis 196 in the manner $P_1$ to place the pawl 180 in a first condition/position in which the locking tab 200 is spaced away from the motor gear 122 of the motor 120 and thereby permits rotation thereof.

Since the locking tab 200 is spaced from the motor gear 122, rotation of the motor gear by the motor 120 in the manner $R_1$ is transferred to the rest of the gear train 140. Accordingly, torque is transferred from the motor 120 to the gear train 140 when the motor is rotated in the manner $R_1$ to apply service braking to the vehicle. It will be appreciated that the attractive force between the electromagnet 220 and the second permanent magnet PM2 [now closest to the tips 223, 225] is sufficient to hold the second permanent magnet in place, and thereby hold the pawl 180 disengaged from the motor gear 122 even when no electrical current is supplied to the electromagnet 220.

Accordingly, during operation of the vehicle 20, the pawl 180 remains disengaged from the motor gear 122 so that service braking events can occur. To this end, the pawl 180 is configured to be inertially neutral (inert) about axis 196 such that the minimally attractive force between the unactuated electromagnet 220 and the second permanent magnet PM2 advantageously is sufficient to prevent pivoting of the pawl 180 about the axis 196 in response to the vehicle driving over potholes, rough road conditions, etc.

At the same time, the motor 120 can be back driven by the retreating piston while the pawl 180 is in the first condition. In particular, the retreating piston rotates the spindle 160 which, in turn, transfers torque through the gear train 140 to the idler gear 172 and ultimately to the motor gear 122. Consequently, the motor 120 is back driving as the service brake is released since the pawl 180 is disengaged from the motor gear 122.

Once the service brake is applied it may alternatively be desirable to then apply the parking brake so that the clamp force is maintained without the need to provide electrical power to the motor 120. The control system 44 determines it is desirable to apply the parking brake either automatically based on sensed vehicle/road conditions or from a command by the vehicle operator. In any case, the motor 120 is rotated in the manner $R_1$ to advance the piston sufficient to apply the parking brake to the rotor 37.

Figure 7A:
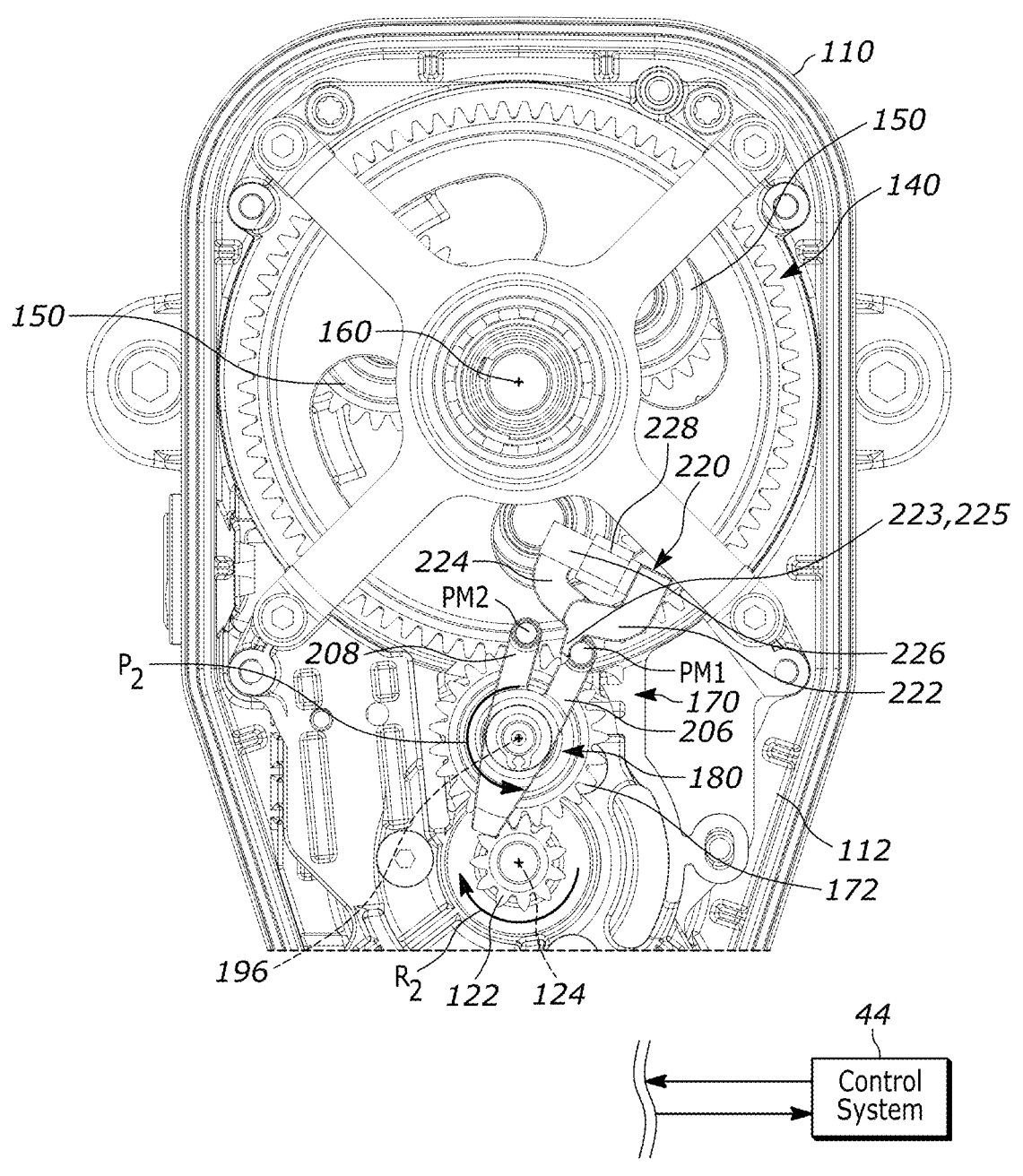
FIG. 7A is a schematic illustration of the locking mechanism in a second condition preventing rotation of the gear stage of the actuator.
Figure 7B:
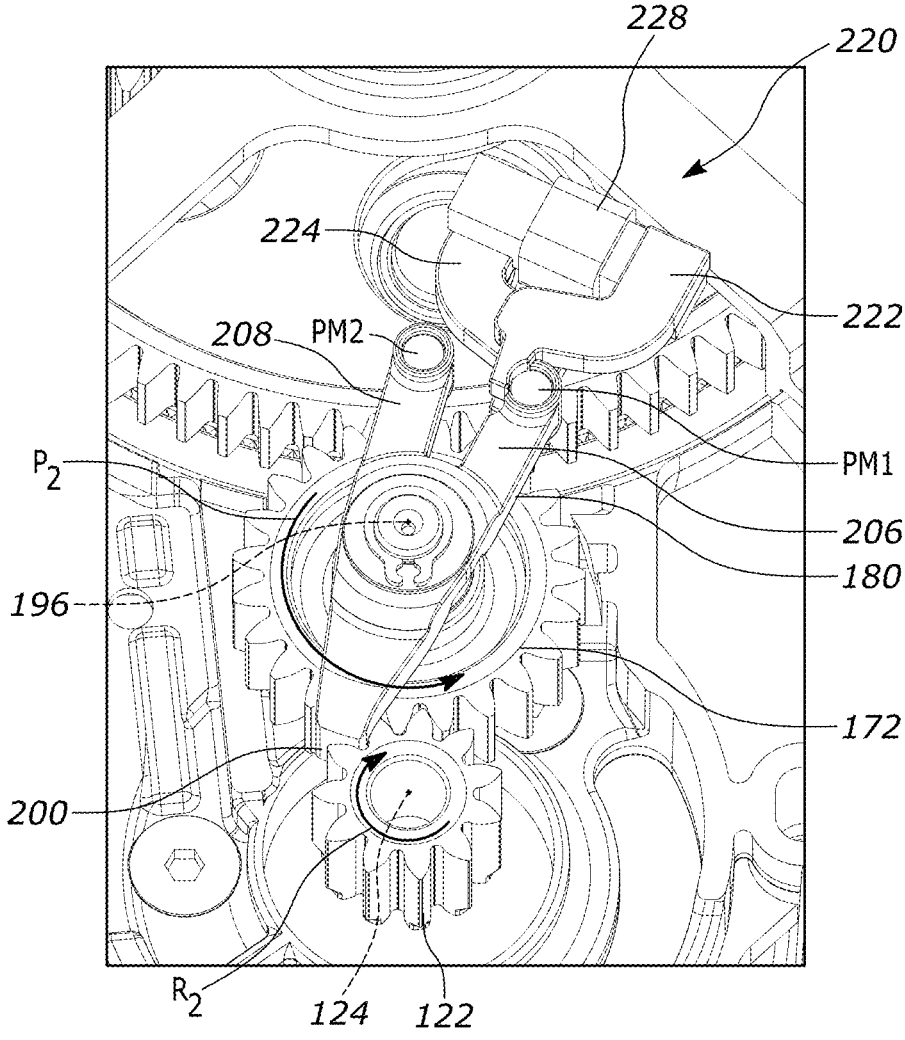
FIG. 7B is an enlarged view of the first end of the pawl when the locking mechanism is in the second condition.

After the braking force F sufficient to apply the parking brake is applied to the rotor 38, the locking mechanism 170 can be actuated to place the pawl 180 in a locked or second condition preventing rotation of the motor gear 122 and thereby preventing back drive thereof, which prevents loss of the braking force F. To this end, the electromagnet 220 is energized with a voltage polarity to cause the pawl 180 to pivot about the axis 196 in the manner $P_2$ shown in FIGS. 7A and 7B. More specifically, the control system 44 sends current to the electromagnet 220, which produces a second magnetic polarity in the arms 222, 224. This second magnetic polarity repels the second permanent magnet PM2 (and thereby repels the arm 208) while attracting the first permanent magnet PM1 (and thereby attracting the arm 206). This causes the pawl 180 to pivot about the axis 196 in the manner $P_2$ to a second condition/position in which the locking tab 200 engages the motor gear 122 (FIG. 7B).

Once the locking tab 200 engages the motor gear 122, the control system 44 reduces the current applied to the motor 120 until ultimately the electrical current supply to the motor is turned OFF. The engagement between the locking tab 220 and the motor gear 122 prevents the motor gear from rotating in the manner $R_2$. In other words, the locked motor gear 122 prevents the rest of the gear train 140 from back driving the motor 120. As a result, the parking brake is maintained on the rotor 37.

It will be appreciated that locking tab 220 and the motor gear 122 are frictionally engaged with one another in a manner that holds the pawl 180 in the engaged/second condition preventing rotation of the motor gear. The specific geometric design of the locking tab 220 and/or motor gear 122 can also contribute to providing sufficient friction between the components to prevent the pawl 180 from becoming disengaged in response to torque applied to the motor gear 122 during, for example, motor 120 back-drive.

Thereafter, to unlock the locking mechanism 170, the motor 120 can be activated in the direction R₁ to remove any load on the pawl 180. The electromagnet 220 is then powered with the voltage polarity that generates the first magnetic polarity, thereby repelling the first permanent magnet PM1 while attracting the second permanent magnet PM2 to permit rotation of the gear 122 and the motor 120 to rotate in the direction R₂ to fully release the parking brake until the piston is retracted to a target position resulting in zero or essentially zero residual clamp force F. The electromagnet 220 can then be powered off with the pawl 180 remaining in the first, disengaged position of FIG. 7A.

Figure 8A:
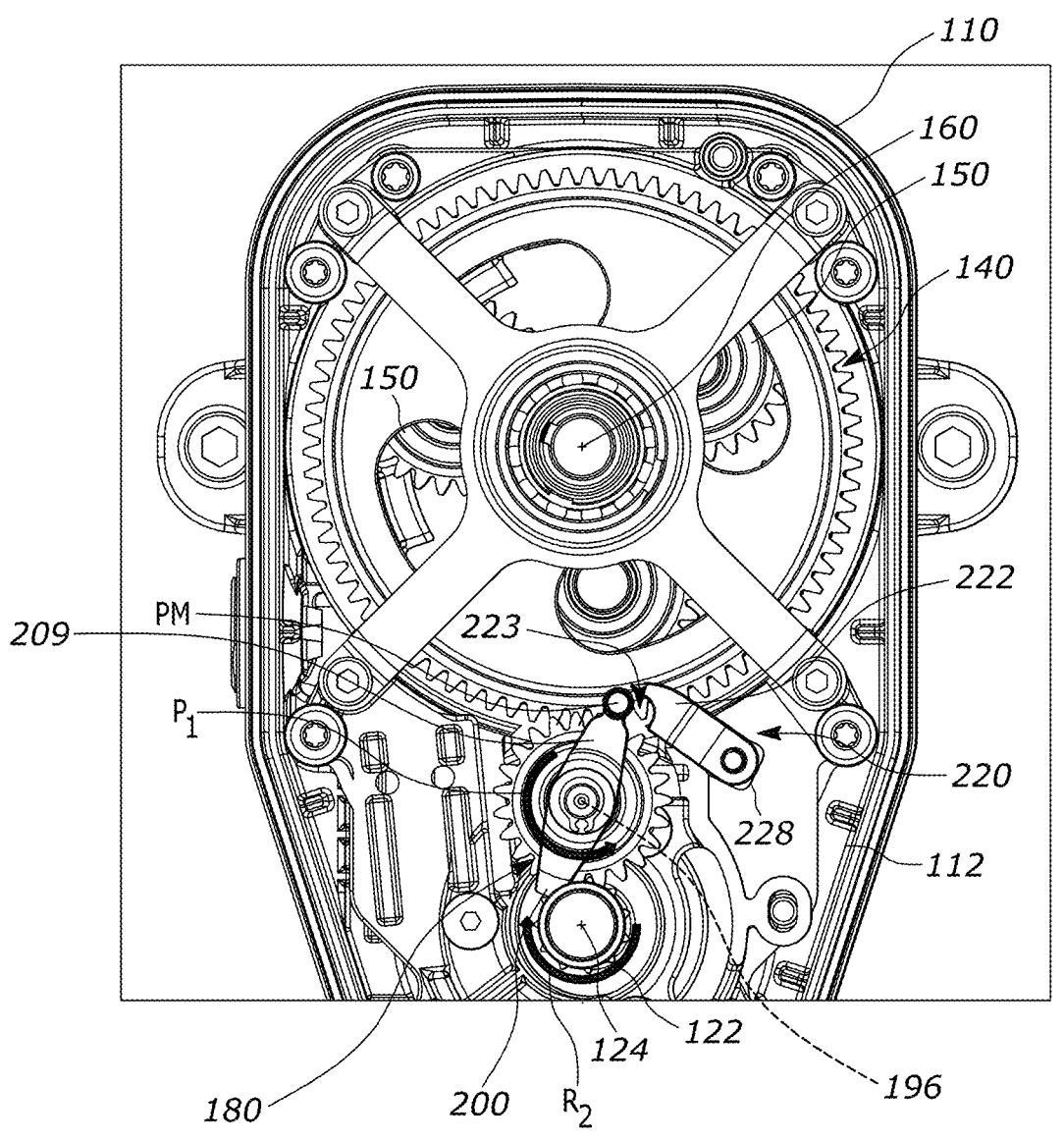
FIG. 8A is a top view of a mono-stable locking mechanism shown in the second condition.
Figure 8B:
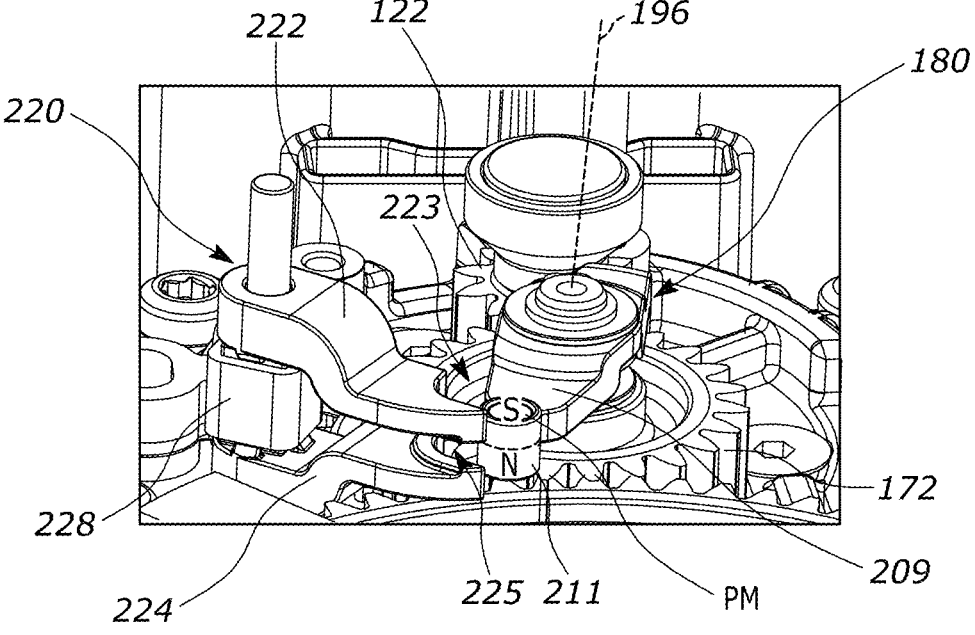
FIG. 8B is an isometric view of the second end of the pawl when the mono-stable locking mechanism of FIG. 8A is in the second condition.
Figure 8B:
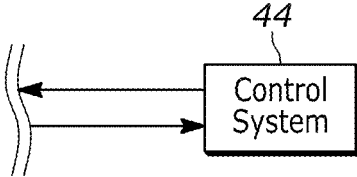
Figure 9:
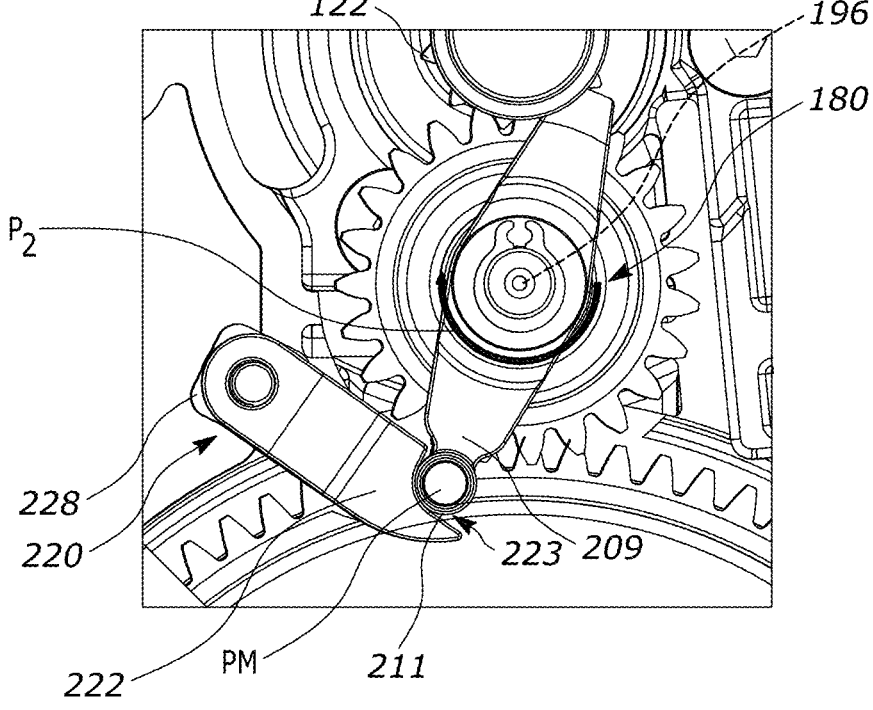
FIG. 9 is a top view of the locking mechanism of FIG. 8A in a first condition.
Figure 9:
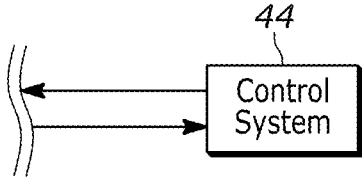

FIGS. 8A-9 illustrate a configuration for a mono-stable locking assembly. In this example, the pawl 180 includes a single arm 209 having a tube 211 for receiving a permanent magnet PM. As shown, in the permanent magnet the south side S sits atop the north side N. Furthermore, each of the arms 222, 224 of the electromagnet 220 includes a respective recess 223, 225. The recesses 223, 225 are generally aligned with one another in a direction extending parallel to the axis 196. The recesses 223, 225 are collectively configured to receive the tube 211.

With that said, the electromagnet 220 is configured to repel the permanent magnet PM in response to current with appropriate polarity being supplied to the electromagnet. (FIGS. 8A and 8B). This pivots the pawl 180 about the axis 196 in the counterclockwise manner P₁ to a position in which the locking tab 200 engages the motor gear 122 to prevent rotation thereof. Consequently, the parking brake is engaged and the vehicle is parked.

The electromagnet 220 is also configured to attract the permanent magnet PM when no current is supplied to the electromagnet (FIG. 9). This pivots the pawl 180 about the axis 196 in the clockwise manner P₂ to a position in which the locking tab 200 disengages the motor gear 122 to allow for the gear train 140 to be free to rotate (service brake mode). In other words, the default/natural position of the pawl 180 is to be disengaged from the motor gear 122 when no current is supplied to the electromagnet 220. Consequently, the brake can be used normally as when the vehicle is traveling on the road The locking mechanism of the present invention is advantageous in that in the bi-stable configuration, once power is removed from the electromagnet the pawl remains in the same rotational position as it was commanded or controlled into before power was removed. Consequently, the pawl is actively held in either the first position (FIG. 6A) by the tips/second permanent magnet or actively held in the second position (FIG. 7A) by the tips/first permanent magnet regardless of whether the electromagnet is powered due to the closer proximity of each permanent magnet to the tips of the electromagnet arms. This configuration allows the locking mechanism to be stable in both rotational positions of the pawl, i.e., bi-stable. Conversely, the locking mechanism shown in FIGS. 6A-6B is mono-stable because the pawl is only actively attracted to/held by the tips when in the first position.

It will be appreciated that in either construction the polarity orientations and strengths of the permanent magnet and the electromagnet are configured such that the pawl is held in either the first position or the second position at all times. In other words, the permanent magnet and electromagnet do not enable the pawl to be held in position between or outside of aforementioned positions.

The locking mechanism of the present invention is also advantageous in that it provides a simple and reliable means to lock and unlock/release the parking brake in a repeatable manner. Moreover, constructing the locking mechanism as inertially inert helps to ensure vibrations occurring during normal operation of the vehicle do not inadvertently induce movement of the pawl. Consequently, a reduced cost, minimal degree of magnetic force is needed to maintain the pawl in the locked of unlocked conditions.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A locking mechanism for a caliper assembly of an electromechanical brake for a wheel rotor, comprising:
   a motor gear of a motor;
   a pawl pivotable relative to the motor gear and extending from a first end to a second end, the first end including a pair of arms and the second end including a locking tab, the pawl having a first position in which the locking tab is spaced from the motor gear to permit torque transfer between the motor gear and the gear train and a second position in which the locking tab engages the motor gear to prevent torque transfer between the motor gear and the gear train;
   first and second permanent magnets provided on the respective arms; and
   an electromagnet cooperating with the first and second permanent magnets to place the pawl in the first position or the second position.

2. The locking mechanism of claim 1, further comprising a control system configured to, in response to a detected braking event, cause the pawl to pivot into engagement with the motor gear to prevent release of clamp force applied to the rotor.

3. The locking mechanism of claim 1, wherein the pawl pivots about a pivot axis spaced from the motor gear.

4. The locking mechanism of claim 3, wherein the pawl has a center of gravity on the pivot axis and is inertially neutral about the pivot axis.

5. The locking mechanism of claim 3, wherein the first permanent magnet is repelled by the electromagnet while the second permanent magnet is attracted by the electromagnet in response to supplying a first voltage polarity to the electromagnet such that the pawl is pivoted to the second position.

6. The locking mechanism of claim 5, wherein the first permanent magnet is attracted to the electromagnet while the second permanent magnet is repelled by the electromagnet in response to supplying a second voltage polarity to the electromagnet such that the pawl is pivoted to the first position.

7. The locking mechanism of claim 1, wherein the one of the arms abuts the electromagnet when the pawl is in the first condition and the other of the arms abuts the electromagnet when the pawl is in the second condition.

8. The locking mechanism of claim 1, wherein the permanent magnet is attracted to the electromagnet when no current is applied to the electromagnet such that the pawl is pivoted to the first position and wherein the second permanent magnet is attracted to the electromagnet when current is applied to the electromagnet such that the pawl is pivoted to the second condition.

9. The locking mechanism of claim 8, wherein the magnetic polarities of the permanent magnets are opposite from one another.

10. The locking mechanism of claim 1, wherein the electromagnet comprises a rare earth magnet.

11. A locking mechanism for a caliper assembly of an electromechanical brake for a wheel rotor, comprising:

a motor gear of a motor;

a pawl pivotable relative to the motor gear and extending from a first end to a second end, the first end including an arm and the second end including a locking tab, the pawl having a first position in which the locking tab is spaced from the motor gear to permit torque transfer between the motor gear and the gear train and a second position in which the locking tab engages the motor gear to prevent torque transfer between the motor gear and the gear train;

a permanent magnet provided on the arm; and an electromagnet cooperating with the permanent magnet to place the pawl in the first position or the second position, the electromagnet including a pair of arms having recesses for receiving the arm of the pawl when the pawl is in the first position.

12. The locking mechanism of claim 11, further comprising a control system configured to, in response to a detected braking event, cause the pawl to pivot into engagement with the motor gear to prevent release of clamp force applied to the rotor.

13. The locking mechanism of claim 12, wherein the pawl pivots about a pivot axis spaced from the motor gear.

14. The locking mechanism of claim 13, wherein the pawl has a center of gravity on the pivot axis and is inertially neutral about the pivot axis.

15. The locking mechanism of claim 13, wherein the permanent magnet is repelled by the electromagnet in response to supplying current to the electromagnet such that the pawl is pivoted to the second position.

16. The locking mechanism of claim 14, wherein the permanent magnet is attracted to the electromagnet when no current is supplied to the electromagnet such that the pawl is pivoted to the first position.

17. The locking mechanism of claim 11, wherein the permanent magnet is misaligned with the electromagnet when the pawl is in the first position.

\* \* \* \* \*